(12) United States Patent
Muller et al.

(10) Patent No.: US 7,280,524 B2
(45) Date of Patent: Oct. 9, 2007

(54) RECEIVER CONTROLLED ISOCHRONOUS TRANSMISSION

(75) Inventors: Thomas Muller, Bochum (DE); Jurgen Schnitzler, Bochum (DE)

(73) Assignee: Nokia Corporation, Espoo (FI)

( * ) Notice: Subject to any disclaimer, the term of this patent is extended or adjusted under 35 U.S.C. 154(b) by 1004 days.

(21) Appl. No.: 10/169,980

(22) PCT Filed: Jan. 12, 2001

(86) PCT No.: PCT/EP01/00341

§ 371 (c)(1),
(2), (4) Date: Oct. 24, 2002

(87) PCT Pub. No.: WO01/52466

PCT Pub. Date: Jul. 19, 2001

(65) Prior Publication Data

US 2003/0109228 A1   Jun. 12, 2003

(30) Foreign Application Priority Data

Jan. 12, 2000   (GB) ................................ 0000573.6

(51) Int. Cl.
*G06F 11/00* (2006.01)
(52) U.S. Cl. ........................ 370/349; 370/236; 370/394
(58) Field of Classification Search ................ 370/310, 370/349, 236, 394
See application file for complete search history.

(56) References Cited

U.S. PATENT DOCUMENTS 4,939,731 A * 7/1990 Reed et al. .................. 714/748
5,684,791 A * 11/1997 Raychaudhuri et al. .. 370/310.2

FOREIGN PATENT DOCUMENTS

EP   0 749 225 A2   12/1996

OTHER PUBLICATIONS

S.K. Biwas, et al., "Design and Implementation of Data-Link Control Protocol for CBR Traffic in Wireless ATM Networks", ICUPC '98, IEEE 1998, International Conference on Universal Communications Conference Preecedings, (CAT No. 98TH8384), pp. 833-839, vol. 2, XP002167294, 1998, New York, NY, USA, ISBN: 0-7803-5106-1.
M. Fahim Tariq, et al., "Robust and Scalable Matching Pursuits Video Transmission Using the Bluetooth Air Interface Standard", IEEE Transaction on Consumer Electronics, IEEE Ind. New York, NY, USA, vol. 46, No. 3, Aug. 2000, pp. 673-681, XP002163930, ISSN: 0098-3063.
International Search Report.

* cited by examiner

*Primary Examiner*—Brian Nguyen
(74) *Attorney, Agent, or Firm*—Banner & Witcoff, Ltd.

(57) ABSTRACT

A Bluetooth radio transceiver, for receiving isochronous data, comprising: receiving means for receiving data; determining mean for determining whether the received data has been correctly or incorrectly received; validation means for determining whether the received data is current; and transmission means, for transmitting, in response to received data, a positive acknowledgement of reception when the received data has been correctly received, a negative acknowledgement when the received data has been incorrectly received and the received data is current and a positive acknowledgement when the received data has been incorrectly received and the received data is not current. The determination of whether data is current occurs at the receiver as opposed to the transmitter.

20 Claims, 3 Drawing Sheets

RECEIVER CONTROLLED ISOCHRONOUS TRANSMISSION

FIELD OF THE INVENTION

The present invention relates to improved communication of isochronous data. In particular it relates to the system comprising a transmitter and receiver, the transmitter itself, the receiver itself and the method of operation.

The Bluetooth protocol is designed for the communication of synchronous, asynchronous and isochronous data.

Isochronous data, is data that is time bounded. That is data which requires a certain data rate but for which the delay is not critical. Such isochronous data may be delayed in its use but only within certain limits before it is outdated and no longer valid. Video, audio and voice streaming are examples of such data, but isochronous data is not limited to these examples.

FIG. 1 illustrates a network (Bluetooth piconet) 2 of radio transceiver units, including a master unit 4 and slave units 6, 8 and 10, communicating by transmitting and receiving radio packets. The master unit is the transceiver unit which initiates the connection of a slave to the network. There is only one master in a network. The network operates in a time division duplex fashion. The transceiver units are synchronised to a common time frame determined by the master unit 4. This time frame consists of a series of time slots of equal length. Each radio packet transmitted in the network has its start aligned with the start of a slot and a single packet is transmitted in the network at a time. When the master unit is performing point-to-point communication a transmitted radio packet is addressed to a particular transceiver which replies to the master unit by transmitting a radio packet addressed to the master unit in the next available time slot. Any time misalignment between the master and a slave is corrected by adjusting the timing of the slave.

The transceivers transmit and receive, in this example, in a microwave frequency band, illustratively 2.4 GHz. The network reduces interference by changing the frequency at which each radio packet is transmitted. A number of separate frequency channels are assigned each with a bandwidth of 1 MHz, and the frequency may hop at a rate of 1600 hops/s. The frequency hopping of the transceivers communicating in or joining the network is synchronised and controlled by the master unit. The sequence of hopping frequencies is unique for the network and is determined by a unique identification of the master unit.

The network is a radio frequency network suitable for transmitting voice information or data information between transceivers. The transmissions made are of low power, for example 0 to 20 dBm, and the transceiver units can effectively communicate over the range of a few centimetres to a few tens or hundred of meters. The master unit has the burden of identifying the other transceiver units within its transmission range and the burden of paging a transceiver unit to set up a communication link between the master unit and that slave unit.

Referring to FIG. 2, a frame 20 is illustrated. This frame 20 is the common time frame used by the network 2 and controlled by the master unit 4. The frame illustratively has slots 22 to 29. The slots designated by even numbers are reserved. Only the master unit can begin transmitting a radio packet aligned with the start of the even numbered slots. The slots designated by odd numbers are reserved. Only radio packets transmitted by a slave, that is radio packets addressed for reception by the master unit can have their start aligned with the start of the odd numbered slots. Each slot is allocated a different one of a sequence of hopping frequencies. It is however, possible for a radio packet to extend over a number of slots and in this case the frequency at which the packet is transmitted remains constant at that allocated to the slot at the start of the packet. A slot has a constant time period and is typically 625 microseconds.

Referring to FIG. 3, a typical radio packet 30 is illustrated. The radio packet has a start 32 and contains three distinct portions: a first portion contains an Access Code 34, a second portion contains a Header 36 and a third portion contains a Payload 38.

BACKGROUND OF THE INVENTION

The Access Code is a series of symbols used in the network to identify the start of a radio packet and effect synchronisation and DC estimation. It has a fixed length. The Access Code used in normal communication is the Channel Access Code which identifies the network and is included in all packets exchanged in the piconet.

The header 36 has a fixed length and contains link control information including the fields: AM_ADDR, ARQN and HEC. The local address (AM_ADDR) is a word uniquely identifying a slave within a network. The local address is assigned to a slave unit by the master unit when the master unit joins the slave to the network. ARQN is used to inform the source of a successful transfer of payload data. It can be a positive acknowledgement ACK, indicating the packet was successfully transferred, or a negative acknowledgement NAK, indicating that the packet was unsuccessfully transferred. HEC is a header integrity check. It is an 8 bit word generated from the header.

The payload 38 during normal communication contains data. The payload is of variable length and may be absent. The payload has a header including the parameter L_CH, a payload body and possibly a Cyclic Redundancy Check (CRC). Generally a Link Layer Control Application Protocol (L2CAP) message is fragmented into several packets 30. The L_CH code indicates whether the payload contains the starting fragment of an L2CAP message or a continuation fragment of an L2CAP message. An a priori negotiation indicates whether the payload relates to isochronous data.

FIG. 4 illustrates a transmitter 40 communicating with a receiver 70 via a channel 60. The transmitter has timer circuitry 42, a controller 44, a transmitter portion 48, a receiver portion 46 and a FIFO memory 50 which stores a L2CAP message having fragments N, N+1 and N+2. The memory 50 receives data 49 for transmission. The data for transmission is stored as payloads N, N+1 and N+2 in portions 52, 54 and 56 respectively. Payload 52 is transmitted first, then N+1, then N+2. The output of memory 50 is connected to the transmitter portion 48 such that the contents of the portion 52 are provided as an input to the transmitter. The transmitter portion 48 encapsulates the contents of memory portion 52 as the payload of a data packet, converts the data packet from baseband to radio frequency and transmits the data packet to the receiver 70 as radio waves. The encapsulation includes the creation and inclusion of a CRC in the payload 38, the attachment of a Header 36 comprising at least AM_ADDR, ARQN and HEC and the attachment of an Access Code 34. The receiver portion 46 receives data packets from the receiver 70 and determines whether they contain an acknowledgement of the transmitted packet (i.e. ARQN). The determination is communicated to controller 44 via signal 45. If ARQN=ACK, that is, the transmitted packet was successfully received, the controller controls the memory 50 and transmitter portion 48 to transmit the payload N+1, in the next transmitted packet. The controller via control signal 43 controls the memory 52 to discard the contents of portion 52, such that the contents of portion 54 move to portion 52 and the contents of portion 56 move to portion 54. Thus packet N+1 is presented for transmission in memory portion 52. If ARQN=NAK, that is the transmitted packet was not successfully received, or otherwise the controller ensures that payload N is retransmitted. The controller does not activate control signal 43 and payload N remains in memory portion 52 for retransmission.

The timer 42 provides an important function when the L2CAP message comprises isochronous data, that is data which "expires" if not successfully transmitted within a certain period of time. The timer 42 records the amount of time for which the current packet in memory portion 52 has been retransmitted. If the value of the timer exceeds a threshold there is a timeout and the controller 44 flushes the memory 50. That is, the controller using discard signal 47 causes the memory 50 to discard all the payloads N, N+1, N+2 which are fragments of the L2CAP message to which the current payload in memory portion 52 belongs.

The receiver 70 has a receiver portion 72, a transmitter portion 74 and verification circuitry 76. The receiver portion 72 communicates with the transmitter portion 48 of transmitter 40, and the transmitter portion 74 communicates with the receiver portion 46 of transmitter 40. The transmitter and receiver portions 72 and 74 are connected to verification circuitry 76. The verification circuitry 76 determines whether a packet has been received correctly. This decision is based on the HEC and on the CRC of the payload, if present. If the payload is correctly received as determined by verification circuitry 76, the transmitter portion sets ARQN=ACK in the next transmitted packet. If the payload is incorrectly received, the transmitter portion sets ARQN=NAK in the next transmitted packet. The transmitter portion includes ARQN in the header of the next transmitted data packet. If a payload of data is also being sent in the transmitted packet it may include a CRC.

It is apparent that the transmitter 40 and receiver 70 operate according to the Automatic Response Request protocol. The contents of memory portion 52 (message N) is transmitted and retransmitted to the receiver 70 by the transmitter 40, until either:

a) the transmitter 40 successfully receives an acknowledgement from the receiver 70 that it has successfully received the packet, or b) a timeout in the transmitter is exceeded.

The preceding description corresponds to the procedure used in the prior art and described in "Specification of the Bluetooth System", v1.0B, Dec. 1, 1999.

The inventors have identified that certain problems arise from the prior art procedure.

Isochronous data, is data that is time bounded. That is data which requires a certain data rate but for which the delay is not critical. Such isochronous data may be delayed in its use but only within certain limits before it is outdated and no longer valid. Video, audio and voice streaming are examples of such data, but isochronous data is not limited to these examples.

The timeout control in the transmitter determines whether isochronous data is outdated. When there is a timeout, not only is the last transmitted packet discarded but so is the whole of the L2CAP message to which it belongs. This results in a loss of data which may be disproportionate to the transmission errors occurring. A single transmission error may result in a whole L2CAP message being discarded. Furthermore the loss of such a large amount of data makes error correction techniques such as forward error correction inapplicable.

It would be desirable to address such problems.

According to one aspect of the present invention there is provided a radio transceiver, for receiving data, comprising:
receiving means for receiving data;
determining means for determining whether the received data has been correctly or incorrectly received;
validation means for determining whether the received data is current;
transmission means, for transmitting, in response to received data,
a positive acknowledgement of reception when the received data has been correctly received,
a negative acknowledgement when the received data has been incorrectly received and the received data is current and
a positive acknowledgement when the received data has been incorrectly received and the received data is not current.

When data is described as "current " in embodiments of the invention it defines
data which at the time of its reception is not outdated.

There may be an exception to this definition. In the case of data which is incorrectly received, "current" preferably defines data which will not be outdated when it is received after a retransmission. Thus, for incorrectly received data, where the received data is not itself outdated, but by the time it is retransmitted and re-received, the re-received data will be outdated, the incorrectly received data is preferably "not current".

That is "current" may describes that data is not outdated but preferably describes that correctly received data is not outdated and that incorrectly received data is data where the possibility of still receiving a retransmission of that data, which is not outdated, still exists.

The received data may be a data packet having a payload which may include isochronous data and a header. The payload of data packets may also contain asynchronous data. The fact that the received data is isochronous may be communicated to the receiver by an a priori negotiation, as in Bluetooth Specification 1.0 b. Alternatively the data packet may contain a parameter that indicates that the packet payload contains isochronous data. In this latter example, the validation means may determine whether the received data is isochronous, for example from the parameter when contained in the packet header.

The validation means comprises a timing means for determining whether received isochronous data is current.

The determining means may determine whether the packet has been correctly or incorrectly received by testing the integrity of the header and/or by testing the integrity of the payload, for example, using a Cyclic Redundancy Check within the payload.

The radio transceiver may further comprise error correction means for correcting errors arising from incorrectly received data which was not current at reception. This is an error correction procedure which is additional to the existing FEC procedure of Bluetooth baseband. This additional error correction is above L2CAP.

The radio transceiver has means for retaining the received data for which a positive acknowledgement has been sent and for discarding received data for which a negative acknowledgement has been sent. The transceiver has a buffer for buffering the retained received data. There may be a buffer before and/or after error connection. The validation means may be coupled to the buffer such that the determination of whether the received data is current has flexibility being dependent upon the content of the buffer. It is preferable that the validation means is coupled to the buffer after error correction but it may alternatively be coupled to the buffer before error correction. The determination means may also be dependent upon the type of error correction employed. Thus the validation means takes into account the surrounding circumstances in determining whether received isochronous data is current or not.

According to a further aspect of the present invention there is provided a system comprising a transmitter and a receiver, wherein the transmitter is arranged to transmit packets of data having payloads including isochronous data and comprises:

first transmission means for transmitting a packet of data to the receiver first reception means for receiving from the receiver, in response to said transmission of the data packet, a positive acknowledgement or a negative acknowledgement, wherein the transmitter is arranged to retransmit a data packet comprising isochronous data unless a positive acknowledgement is received, and the receiver comprises:

second receiving means for receiving data transmitted by the transmitter; determining means for determining whether the received data has been correctly or incorrectly received;

validation means for determining whether the received data is current;

second transmission means, for transmitting in response to received data, a positive acknowledgement of reception when the received data has been correctly received or a negative acknowledgement when the received data has been incorrectly received and the received data is current or a positive acknowledgement when the received data has been incorrectly received and the received data is not current.

According to a still further aspect of the present invention there is provided a method of communicating isochronous data between a transmitter and a receiver comprising the steps of:

a) sending the isochronous data from the transmitter to the receiver;

b) receiving the isochronous data at the receiver;

c) determining whether the isochronous data has been correctly received;

d) determining whether the isochronous data is current;

e) transmitting a positive or negative acknowledgement from the receiver to the transmitter, in dependence on steps c) and d);

f) re-transmitting the isochronous data from the transmitter to the receiver unless a positive acknowledgement is received at the transmitter from the receiver.

Step e) preferably comprises transmitting a positive acknowledgement unless the received isochronous data is both incorrectly received and current. The method may further comprise transmitting new data from the transmitter to the receiver when a positive acknowledgement is received at the transmitter from the receiver.

It will therefore be appreciated that embodiments of the present invention in its various aspects have several advantages. One advantage, is an increase in performance. When a payload is incorrectly received and the payload contains isochronous data which is no longer current, a whole L2CAP message is not discarded because the timeout of the isochronous data is moved from the transmitter to the receiver side. Instead, the incorrectly received payload may be retained and the transmitter is instructed to send the next payload. This efficiency also provides for the use of additional error correction techniques such as FEC, which further increases the performance. Thus embodiments of the invention avoid discarding data except those bits actually lost via transmission errors.

For a better understanding of the present invention and to further understand how the same may be brought into effect, reference will now be made by way of example only to the enclosed drawings in which:

DETAILED DESCRIPTION OF THE INVENTION

Figure 1:
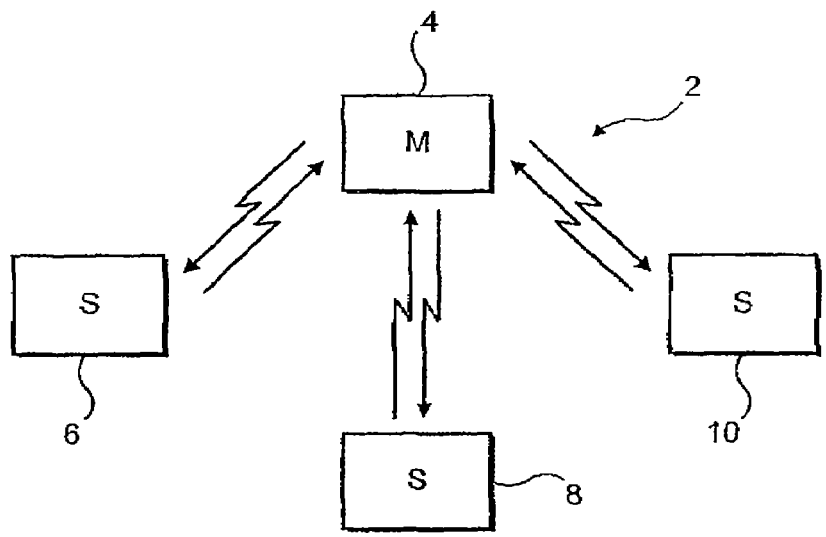
FIG. 1 illustrates a communications network including a master and slave units.
Figure 2:
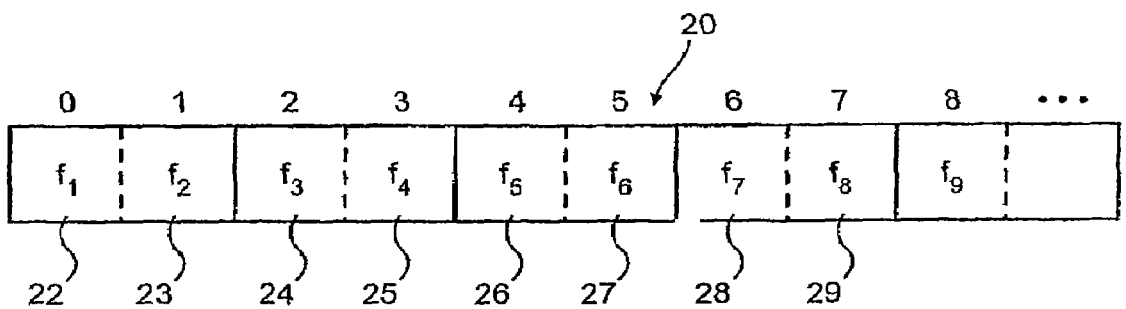
FIG. 2 illustrates the time frame of the communications network.
Figure 3:
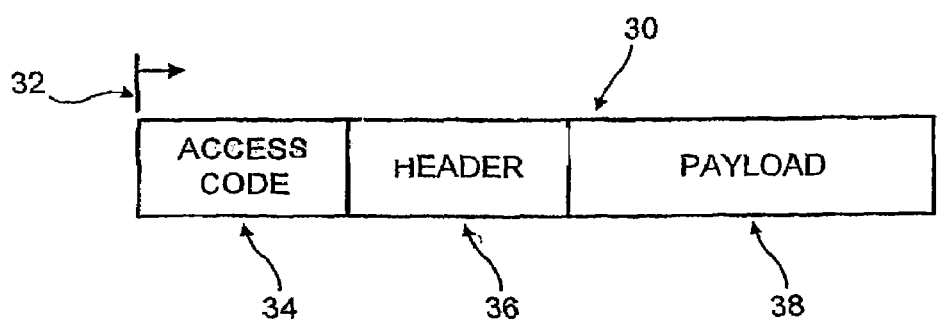
FIG. 3 illustrates a radio packet.
Figure 4:
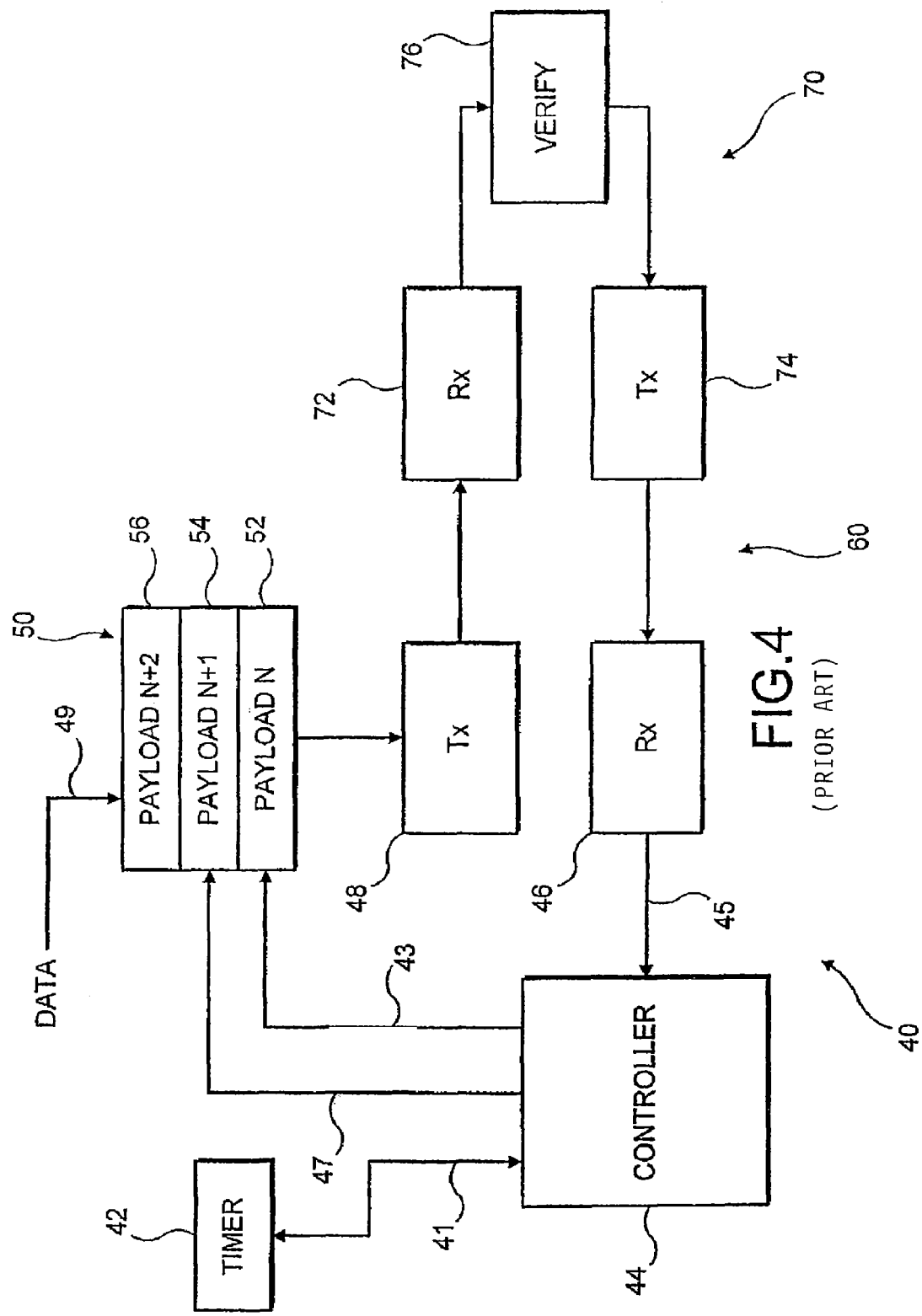
FIG. 4 is a schematic illustration of a transmitter and receiver operating according to the prior art.
Figure 5:
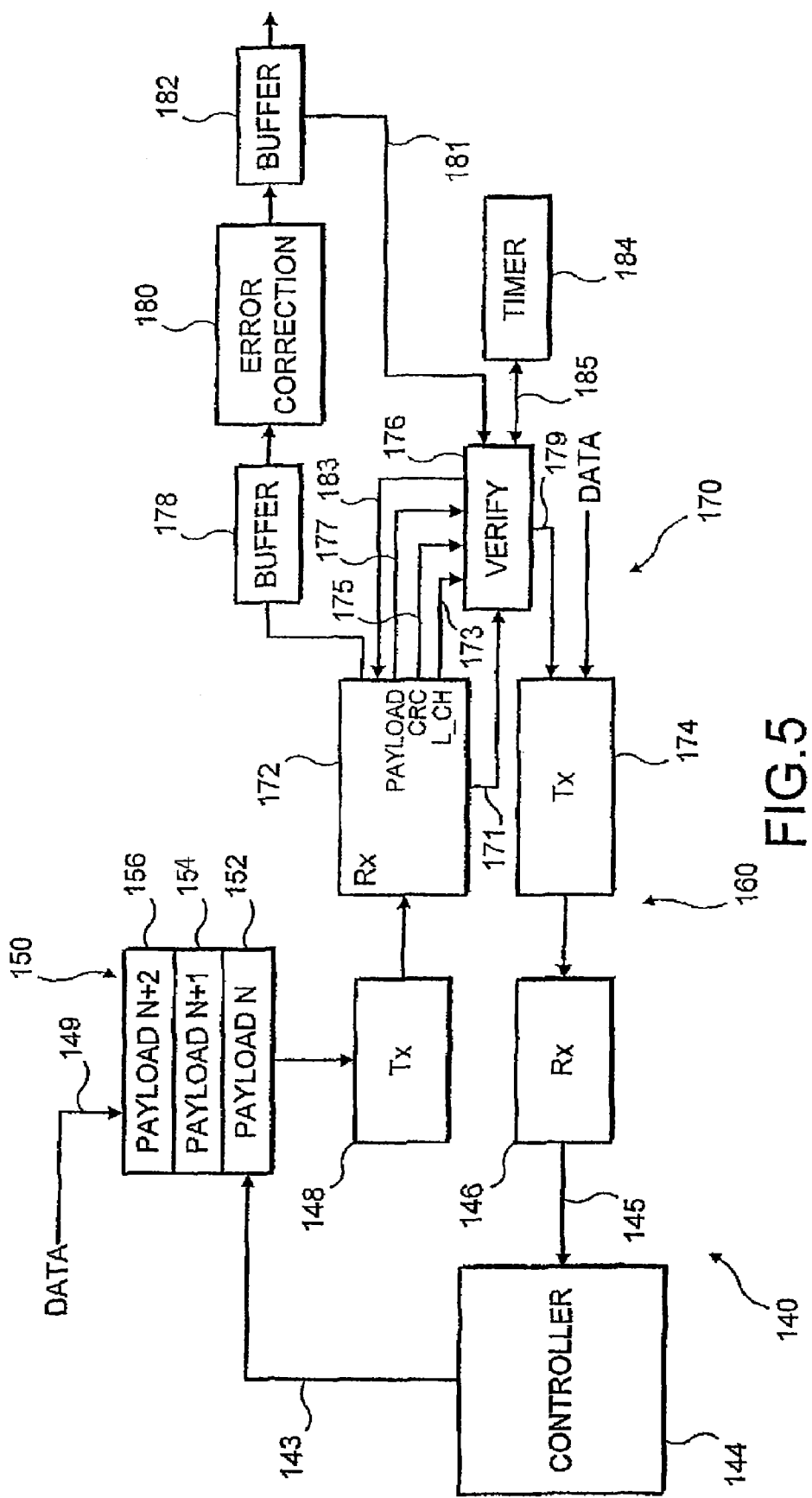
FIG. 5 is a schematic illustration of a transmitter and receiver operating according to an embodiment of the present invention.

FIG. 5 illustrates one embodiment of the present invention in which a transmitter 140 communicates with a receiver 170 via a channel 160. The, transmitter has a controller 144, a transmitter portion 148, a receiver portion 146 and a FIFO memory 150 which stores a L2CAP message having fragments N, N+1 and N+2. The memory 150 receives data 149 for transmission. The data for transmission is stored as payloads N, N+1 and N+2 in portions 152, 154 and 156 respectively. Payload 152 is transmitted first, then N+1, then N+2. The output of memory 150 is connected to the transmitter portion 148 such that the contents of the portion 152 are provided as an input to the transmitter. The transmitter portion 148 encapsulates the contents of memory portion 152 as the payload of a data packet and transmits the data packet to the receiver 170. The encapsulation includes the creation and inclusion of a CRC in the payload 38, the attachment of a Header 36 comprising at least AM_ADDR, ARQN and HEC and the attachment of an Access Code 34. The receiver portion 146 receives data packets from the receiver 170 and determines whether they contain an acknowledgement of the transmitted packet (i.e. ARQN). The determination is communicated to controller 144 via signal 145. If ARQN=ACK, that is, the transmitted packet was successfully received, the controller controls the memory 150 and transmitter portion 148 to transmit the payload N+1, in the next transmitted packet. The controller via control signal 143 controls the memory 150 to discard the contents of portion 152, such that the contents of portion 154 move to portion 152 and the contents of portion 156 move to portion 154. Thus packet N+1 is presented for transmission in memory portion 152. If ARQN=NAK, that is the transmitted packet was not successfully received, the controller ensures that payload N in memory portion 152 is retransmitted. The controller does not activate control signal 143 and payload N remains in memory portion 152 for retransmission.

The receiver 170 has a receiver portion 172, a transmitter portion 174, verification circuitry 176, a first buffer 178 for buffering the payload(s) of a received packet(s), error correction circuitry 180 and a second buffer 182 for buffering the received data for output.

The receiver portion 172 converts a received signal to baseband. The receiver portion obtains HEC from the packet header, L_CH from the payload header and CRC from the payload itself. It provides to the verification circuitry 176, HEC as signal 171, L_CH in signal 173, CRC as signal 175 and the payload as signal 177.

The verification circuitry determines if the payload was correctly received. The verification uses the HEC and/or the CRC to determine if a packet has been correctly received. The verification circuitry calculates a temporary HEC from the packet header received in signal 177 and compares it with the HEC received in signal 171. If the temporary HEC and received HEC correspond, the header has been correctly received, the verification circuitry calculates a temporary CRC of the payload received as signal 177 and compares it to the CRC received as signal 175. If the calculated and received CRCs correspond the payload has been received correctly, if they do not the payload has been incorrectly received.

According to a preferred embodiment, the verification of HEC is performed first, then the verification of CRC is performed if and only if the header was correctly received.

If the payload is received correctly the verification circuitry via control signal 183 causes the receiver portion 172 to write the received payload to the buffer 178 along with an associated flag indicating that the payload data is correct. The verification circuitry via control signal 179 also causes ARQN=ACK in the header of the packet transmitted in response by transmitter portion 174.

If the received packet contains isochronous data (indicated by a priori negotiation between transmitter and receiver as in Bluetooth Specification 1.0 b or indicated by a parameter in signal 173) and the payload is received incorrectly, the verification circuitry may respond in one of two ways.

If the received isochronous data is not current, i.e. by the time a retransmission of the isochronous data is received it will be outdated, the verification circuitry via control signal 183 causes the receiver portion 172 to write the received payload to the buffer 178 along with an associated flag indicating that the payload data is incorrect. The verification circuitry via control signal 179 also causes ARQN=ACK in the header of the packet transmitted in response by transmitter portion 174.

If the received isochronous data is current, i.e. by the time a retransmission of the isochronous data is received it will not be outdated, the verification circuitry via control signal 179 causes ARQN=NAK in the header of the packet transmitted in response by transmitter portion 174. No data is transferred from receiver portion 172 to buffer 178.

The data in buffer 178 is passed to error correction circuitry 180 where errors in the buffered data are corrected. The data stored in the buffer may be applied to the error correction circuitry in multiples of payloads (one or more).

The exact multiple will depend upon the number of successive payloads to which a single error correction procedure is applied. It may be convenient, for example, to apply an error correction procedure (such as Forward Error Correction FEC) over an L2CAP message at the transmitter 140. It would therefore be necessary to apply the error correction process at the receiver 170 over the same period namely, an L2CAP message.

The data in buffer 178 may contain correctly and incorrectly received payloads. The error correction process reduces or removes the errors arising from the incorrectly received payloads. Any suitable error correction process may be used in the transmitter 140 with the complimentary process being used in receiver 170. Forward Error Correction is the preferred error correction mechanism using for example Reed-Solomon Codes or (punctured) convolution codes, possibly with interleaving. FEC can recover the uncertain or lost parts of the payload.

According to one error correction procedure, the complete payload flagged as incorrectly received is considered to be erased.

According to a preferred error correction procedure, the complete payload flagged as incorrectly received is included in the data stream with the correctly received payloads. Burst error coding or interleaving can be used to correct the bit errors in the incorrectly received payload.

Error concealment may be used to deal with residual errors.

The data from the error correction circuitry 180 is stored in a second buffer 182 ready for use.

The verification circuitry 176 determines whether data is current or not according to two inputs. The first input 185 is from a timer 184, which records the time since the last correctly received data packet. The time measurement may for example be a measure of the number of successive NAK acknowledgements sent to the transmitter 140 or the real time since the last ACK was sent to the transmitter 140. The second, optional, input is a dynamic signal 181 indicating the amount of data in the buffer 182 (and/or buffer 178). The more data that is stored in the buffer ready for use, the longer the currently received data remains current. If the buffer is empty the received data is no longer current. The verification circuitry according to one embodiment, uses an algorithm taking the two inputs as arguments to calculate whether a payload which has been incorrectly received is current or not. The response of the verification circuitry 176, is dependent upon whether the incorrectly received payload is calculated as being current or not.

Current incorrectly received data is data where the possibility of still receiving a retransmission of that data, which is not outdated, still exists.

It is apparent that the transmitter 140 and receiver 170 operate according to a modified Automatic Response Request protocol. The contents of memory portion 152 (message N) is transmitted and retransmitted to the receiver 170 by the transmitter 140, until the transmitter 140 receives an acknowledgement from the receiver 170 that it has successfully received the packet.

When the receiver correctly receives a payload, it responds with a positive acknowledgement ACK, which prevents the retransmission of that payload and requests the transmission of the next payload, and retains the correctly received payload.

The receiver determines whether an incorrectly received payload containing isochronous data is current. If it is, a negative acknowledgement NAK is sent in response, requesting the retransmission of the payload and the incorrectly received payload is discarded. If it is not a positive acknowledgement ACK is sent in response, terminating the retransmission of the payload and requesting the transmission of the next payload and the incorrectly received payload is retained. Error correction procedures may be used on the incorrectly received payload.

In the previously described embodiment, if the payload is received correctly the verification circuitry via control signal 183 causes the receiver portion 172 to write the received payload to the buffer 178 along with an associated flag indicating that the payload data is correct. If the payload is received incorrectly, and it is current, the payload is not transferred to buffer 178, however, if it is not current the received payload is transferred to the buffer 178 along with an associated flag indicating that the payload data is incorrect. Consequently, either a correctly received payload or the last incorrectly received payload is stored in the buffer for further processing. According to another embodiment, each incorrectly received version of a payload is stored in the verification circuitry 176 which uses this diversity to produce an improved version that takes into account all, or at lest the best, received versions of the payload. When the positive acknowledgement ACK is given, on receiving a non-current and incorrect payload, the verification circuitry transfers the improved version of the payload (instead of the received incorrect payload) to the buffer 178 along with an associated flag indicating that the payload data is incorrect via the receiver part 172 using signal 183.

Diversity gain is used to improve bit errors and produce the improved version of the payload from the received versions. For example, the value of a bit in the improved version can be determined by a majority decision taking into account the corresponding bit value for each received version (if 3 or more versions are received). Alternatively a soft decision may be taken on each bit of the improved version, by averaging the corresponding bit values for the received versions. As a further alternative, instead of taking a decision here, the soft information (e.g. averaged bit weight) can be conveyed to the subsequent units, such that the application can take into account the bitwise reliability information.

An improved version of the incorrectly received payload could be determined by the verification circuitry each time such a payload is in correctly received, thus keeping an updated improved version. A general confidence measure of the updated improved version thus determined could be calculated and if it is high enough, the verification circuitry could accept the updated improved version of the payload by providing a positive acknowledgement ACK and transferring the improved version of the payload (instead of the received incorrect payload) to the buffer 178 along with an associated flag indicating that the payload data is incorrect via receiver part 172 using signal 183.

Although Cyclic Redundancy Checking CRC has been used in the preceding embodiment to determine whether a payload has been correctly received, any suitable checking scheme may be used in the alternative.

Although embodiments of the present invention have been described in the preceding paragraphs with reference to various examples, it should be appreciated that modifications and variations to the examples given can be made without departing from the scope of the invention as claimed.

The invention claimed is:

1. A radio transceiver, for receiving data, comprising:
  receiving means for receiving data;
  determining means for determining whether the received data has been correctly or incorrectly received;
  validation means for determining whether the received data is current;
  transmission means, for transmitting, in response to the received data, a positive acknowledgement of reception when the received data has been correctly received, a negative acknowledgement when the received data has been incorrectly received and the received data is current and a positive acknowledgement when the received data has been incorrectly received and the received data is not current.

2. A radio transceiver as claimed in claim 1 further comprising means for retaining the received data for which a positive acknowledgement has been sent.

3. A radio transceiver as claimed in claim 2, further comprising a buffer for buffering the retained received data.

4. A radio transceiver as claimed in claim 3, wherein the validation means is coupled to the buffer wherein the determination of whether the received data is current is dependent upon content of the buffer.

5. A radio transceiver as claimed in claim 1, wherein the data is isochronous data.

6. A radio transceiver as claimed in claim 1, wherein the radio transceiver is arranged to receive data as data packets having a payload.

7. A radio transceiver as claimed in claim 6, wherein the validation means determines whether the received data is isochronous data, in addition, to whether the isochronous data is current.

8. A radio transceiver as claimed in claim 7 wherein the received data packet provides an indication of whether the payload contains isochronous data, wherein the validation means determines whether the received data is isochronous in dependence upon said indication.

9. A radio transceiver as claimed in claim 6, wherein said data is received in the payload of a data packet having a header, and said determining means determines whether the data packet has been correctly or incorrectly received by testing the integrity of the header.

10. A radio transceiver as claimed in claim 9, wherein said payload includes a Cyclic Redundancy Check.

11. A radio transceiver as claimed in claim 1, wherein said validation means comprises a timing means for determining whether received isochronous data is current.

12. A radio transceiver as claimed in claim 1, wherein said data is received in a data packet including a header, and said determining means determines whether the data packet has been correctly or incorrectly received by testing the integrity of the header.

13. A radio transceiver as claimed in claim 1, further comprising error correction means for correcting errors in incorrectly received data which was not current at reception.

14. A radio transceiver as claimed in claim 1, further comprising means for determining an improved version of first data having received consecutively a plurality of incorrect versions of said first data for which a negative acknowledgement has been sent and means for retaining the improved version after the transmission of a positive acknowledgement.

15. A system comprising a transmitter and a receiver, wherein the transmitter is arranged to transmit packets of data having payloads including isochronous data, the system comprising:
  the transmitter comprises:
    first transmission means for transmitting a packet of data to the receiver;
    first reception means for receiving from the receiver, in response to said transmission of the data packet, a positive acknowledgement or a negative acknowledgement,
    wherein the transmitter is arranged to retransmit a data packet comprising isochronous data, unless a positive acknowledgement is received, and
  the receiver comprises:
    second reception means for receiving data transmitted by the transmitter;

determining means for determining whether the received data has been correctly or incorrectly received;

validation means for determining whether the received data is current;

second transmission means, for transmitting in response to the received data, a positive acknowledgement of reception when the received data has been correctly received, a negative acknowledgement when the received data has been incorrectly received and the received data is current, and a positive acknowledgement when the received data has been incorrectly received and the received data is not current.

16. A method of communicating isochronous data between a transmitter and a receiver comprising the steps of:
   a) sending the isochronous data from the transmitter to the receiver;
   b) receiving the isochronous data at the receiver;
   c) determining whether the isochronous data has been correctly received;
   d) determining whether the isochronous data is current;
   e) transmitting a positive or negative acknowledgement from the receiver to the transmitter, in dependence on steps c) and d), a positive acknowledgement being transmitted when the received isochronous data is correctly received, a negative acknowledgement being transmitted when the received isochronous data is both incorrectly received and current, and a positive acknowledgement when the received isochronous data is incorrectly received and not current;
   f) re-transmitting the isochronous data from the transmitter to the receiver unless a positive acknowledgement is received at the transmitter from the receiver.

17. A method as claimed in claim 16 further comprising transmitting new data from the transmitter to the receiver when a positive acknowledgement is received at the transmitter from the receiver.

18. A radio transceiver, for receiving data, comprising:
   a receiving component configured to receive data;
   a determining component configured to determine whether the received data is correct;
   a validation component configured to determine whether the received data is current;
   a transmission component configured to transmit, in response to the received data, a positive acknowledgement when the received data is correct, a negative acknowledgement when the received data is not correct and the received data is current, and a positive acknowledgement when the received data is not correct and the received data is not current.

19. A radio transceiver as claimed in claim 18, wherein the data is isochronous data.

20. A radio transceiver as claimed in claim 18, wherein the data includes packets having a payload.

* * * * *